Oct. 25, 1955     E. A. HEDLUND     2,721,377
TOOL FOR INSTALLING CRANKSHAFT HUBS
Filed July 25, 1951
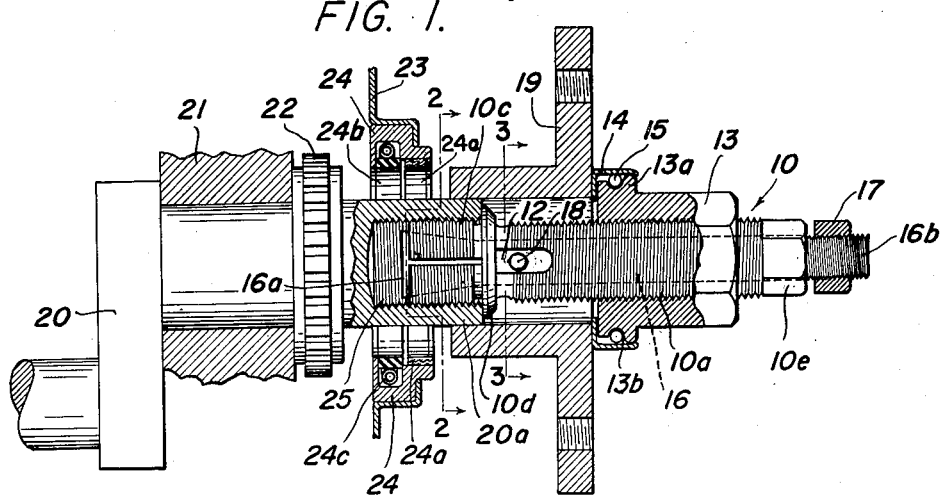
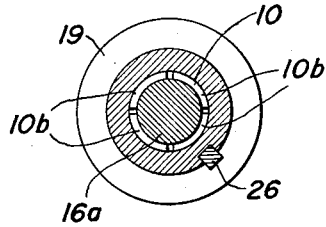
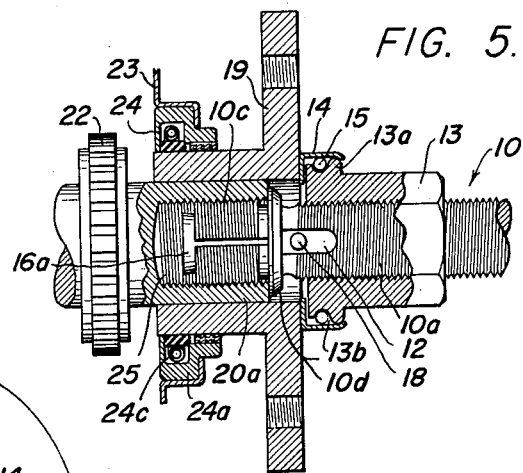
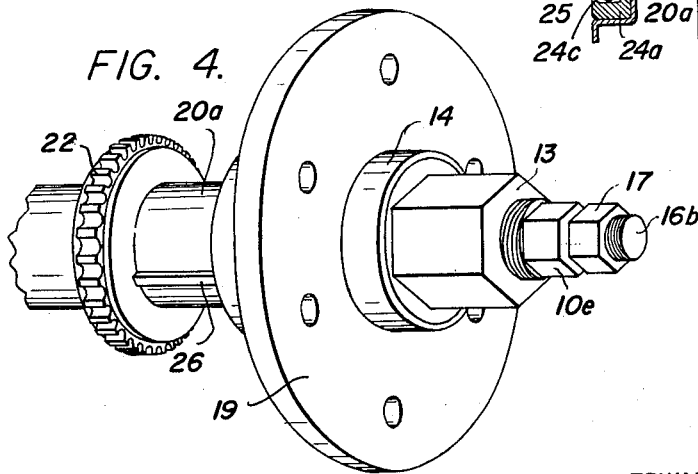
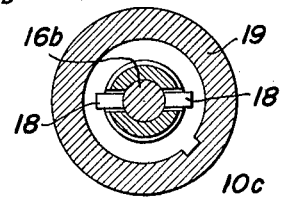
Inventor:
EDWARD A. HEDLUND,
Attorneys.

United States Patent Office 2,721,377
Patented Oct. 25, 1955

2,721,377
TOOL FOR INSTALLING CRANKSHAFT HUBS

Edward A. Hedlund, Salt Lake City, Utah

Application July 25, 1951, Serial No. 238,423

4 Claims. (Cl. 29—264)

This invention relates to special tools for use by mechanics in the repair of engines, especially automotive engines employed in many modern passenger cars and trucks.

The crankshafts of many modern automotive engines, particularly the engines used in automobiles and trucks produced by the Chrysler Corporation, have counter-balancing hubs pressed tightly into place on the front ends thereof. The hub serves as a seat for the oil seal assembly of the timing chain cover and as a means for securing the vibration dampener. In some instances it has its flange formed to serve as the fan drive pulley of the engine assembly. In the making of certain repairs on the engine, such as the replacing of the front oil seal of the crankshaft, the replacement of timing chain or sprocket, and various other items of repair to the front end of the engine, it is necessary that the hub be removed. This means, of course, that it must be replaced upon completion of the repairs.

A crankshaft hub is customarily reinstalled by the use of a hammer, punch, or other driving tool. This operation not only involves the exercise of considerable manual exertion and consumes considerable time, but it is difficult to accomplish without damaging the replacement oil seal assembly being installed coincidentally. Furthermore, working space is limited, making use of the above-mentioned tools especially difficult.

A principal object of the present invention is to provide a tool which will utilize the power of the engine itself, or of the starter motor working through the engine, to quickly and easily press the hub back into its tightly fitting position on the front end of the crankshaft without damaging the replacement oil seal assembly.

In developing such a tool along the lines of the hub puller of my copending application for patent, Serial Number 227,441 filed May 21, 1951, now Patent No. 2,684,527, wherein a left-hand threaded reaction shaft is utilized, I found that an automatic release for the tool is necessary in order to prevent equipment damage and personal injury to the mechanic. It is imperative that the tool release its hold on the crankshaft at such time as the hub is completely repositioned thereon, since it is impossible to halt engine rotation at precisely the right time, and any over-run would be damaging and dangerous.

Accordingly, another object of the invention is to provide a positive automatic release for the hub installing tool.

Since working space is limited, it is also necessary—and is a further object of the invention—to provide a tool which can function effectively within the limited space available.

In the accomplishment of these objectives and purposes of the invention, I utilize a left-hand threaded reaction shaft, having a split and right-hand threaded end which screws into the customary threaded recess in the front end of the crankshaft and normally anchors the reaction shaft in firm operating position. A traveler nut is screwed onto the left-hand threaded, main portion of the reaction shaft, for riding backwardly thereon as the crankshaft and the reaction shaft—accompanied by the hub—rotate in the usual clockwise direction to gradually and evenly press the hub onto the crankshaft.

The traveler nut is held against rotation in any suitable manner, for example by means of a wrench held by a mechanic.

Automatic release of the tool is accomplished by means of a wedge arrangement, normally effective to expand the split, anchoring end of the reaction shaft, but engageable by the traveler nut—as the latter reaches the end of its operative stroke—to effect dislodgment of the wedge member from its expanding position, whereby reaction thrust at the end of the operative stroke of the traveler nut forces unscrewing of the anchored end of the reaction shaft from the crankshaft.

Further objects and features of the invention will become apparent from the following detailed description of the preferred and typical embodiment illustrated in the accompanying drawing.

In the drawing:

Fig. 1 represents a central, vertical section taken through the tool of the invention as it appears during installation of a crankshaft hub on the forward end of a crankshaft, portions of the crankshaft and of associated structure, including the usual oil seal assembly, being illustrated more or less schematically;

Fig. 2, a vertical transverse section taken on the line 2—2 of Fig. 1;

Fig. 3, a similar section taken on the line 3—3 of Fig. 1;

Fig. 4, a perspective view of the tool and part of the associated structure appearing in Fig. 1; and Fig. 5, a view largely corresponding to that of Fig. 1, but showing the crankshaft hub completely repositioned on the crankshaft and within the oil seal assembly, and the reaction shaft of the tool released from its wedged securement to the crankshaft and about to commence its automatic unscrewing from the receiving recess of the crankshaft.

Referring to the drawing:

The illustrated embodiment of the invention comprises a reaction shaft 10 of tubular formation, having the major portion of its length provided with left-hand threads 10a.

One end of this reaction shaft is split, preferably in quadrants, see 10b, Fig. 2, and is provided, externally, with right-hand threads 10c. A circumferential flange 10d is provided at the inner termination of the right-hand threading and of the splits dividing such right-hand threaded end. A set of oppositely disposed, elongate slots 12 extend a short distance along the length of the left-hand threaded portion 10a of the reaction shaft 10, commencing at the circumferential flange 10d, for a purpose hereinafter made clear. The opposite end of the reaction shaft is formed hexagonally, as at 10e, for the reception of a wrench for tightly screwing the threaded end 10c of the shaft into the internally and right-hand threaded recess customarily provided in the forward end of the crankshaft of a modern automotive engine.

Threaded onto the left-hand threaded portion 10a of the reaction shaft, is a traveler nut 13, serving as hub pusher. For enabling the hub being installed to freely rotate during the pushing operation, without conflict with the traveler nut, which is held stationary, for example by a mechanic using a wrench, such traveler nut 13 is provided with a freely rotatable pusher ring 14, Figs. 1 and 5, fitted over its circular end 13a. Such circular end 13a is provided with a raceway 13b for ball bearings 15. Thus, the pusher ring 14 freely rotates on a ball bearing mount during operation of the tool.

Extending through the hollow center of the tubular reaction shaft 10, for the purpose of actuating automatic release of the tool from the crankshaft, is a rod 16, having a wedge shaped end 16a which fits into a correspondingly recessed portion of the right-hand threaded end 10b of the reaction shaft. Such rod 16 is unthreaded throughout the greater part of its length, but has its opposite end 16b threaded. The rod 16 is longer than the reaction shaft 10, and its threaded end 16b projects outwardly beyond the hexagonally formed end 10e of the reaction shaft to receive an operating nut 17. A pin 18 is fitted through a suitable receiving bore provided transversely of the rod 16 at a location intermediate the length of the rod which places outwardly projecting portions of the pin at positions within the respective slots 12. The placement of the pin 18 is important, since it is the trigger, so to speak, by which automatic release of the tool is effected.

The tool is here shown in the process of pushing a counter balancing hub 19 onto the forward end 20a of the crankshaft 20 of a typical engine to which the tool is applicable. Such crankshaft 20 is journaled in a forward main bearing 21, and has installed immediately forwardly of such main bearing a customary timing chain sprocket 22. A fragmentary portion of a customary timing chain cover 23 is illustrated in the position which it normally occupies relative to the other parts mentioned. It carries a seal ring assembly 24, serving as an oil seal for the front end of the engine. Such seal ring assembly 24 is of conventional formation, and embodies internally exposed rings 24a and 24b of felt and synthetic rubber or leather, respectively, the synthetic rubber ring being resiliently backed by an annular coil spring 24c.

It is customary practice to replace the oil seal ring assembly 24 whenever the hub 19 is removed. Because the hub fits tightly within the oil seal ring assembly, considerable trouble has been heretofore encountered in pressing the hub into place without damaging the flexible seal rings 24a and 24b. Furthermore, it has been very difficult to drive the hub into place evenly on the front end of the crankshaft.

Crankshafts of the type concerned are provided with an internally threaded recess at their forward extremities, see the recess 25, Fig. 1. The threading of such a recess is always right-hand, and the crankshaft always turns clockwise. In using the tool of the invention, the split, right-hand threaded end 10c of the reaction shaft 10 is screwed into the recess 25, as aforementioned, by using a wrench on the hexagonal end 10e.

In replacing a counterbalancing hub, such as 19, which has been removed from the front end of a crankshaft, such as 20, the hub is first started onto the crankshaft end by a firm push or a light tap. Such a start need be merely sufficient to hold the hub in position during placement of the tool. While in most instances a certain amount of care will be exercised to see that the hub is started reasonably straight, the tool will function properly even though the hub is started crookedly, and will automatically straighten the hub relative to the crankshaft during the course of the hub pushing operation.

Following the starting of the hub onto the front end of the crankshaft in the manner described above, the tool is screwed into its operating position; that is to say, the right-hand threaded end 10c of the reaction shaft is screwed into the internally threaded recess 25 by using a wrench on the hexagonal end 10e. Anchorage of the tool to the crankshaft is completed by tightening the nut 17 when the flange 10d of the tool abuts against the end of the crankshaft. Immediately thereafter, the nut 17 is loosened by approximately one turn to provide for slight longitudinal movement of the rod 16 to the left, from the standpoint of the drawing, to provide leeway for automatic release.

Tightening of the nut 17 on the rod 16 against the hexagonal end 10e of the reaction shaft 10, forcibly draws the rod 16 forwardly within the reaction shaft 10 a slight but sufficient distance to cause the wedge shaped end 16a of the rod to expand the split end portion or quadrants 10b of the reaction shaft into binding relationship with the threads of the crankshaft recess 25. Loosening of the nut 17 permits the wedge to be moved back out of its wedging position when the traveler nut 13 presses against the pin 18 and displaces rod 16 to the left.

Following initial positioning of the tool in the above manner the mechanic applies a wrench to the traveler nut 13, and either holds it or makes sure that it is held in place as he operates the starter motor to cause the crankshaft to rotate in a clockwise direction. Rotation of the crankshaft effects rotation of the hub 19, because of the spline 26, Fig. 2. Because of the binding of the threads 10b of the reaction shaft in those of the crankshaft recess 25, rotation of the crankshaft also effects rotation of the entire tool, with the exception of the traveler nut 13 which is held against rotation. The traveler nut 13, however, rides backwardly along the left-hand threading 10a of the reaction shaft, pushing hub 10 onto the end of crankshaft 20 as it travels. The action is smooth and easy, because of the rotating bearing ring 14.

At the termination of the pushing stroke, that is to say, when the hub 19 is satisfactorily positioned on the crankshaft, the tool is automatically released from its securement or anchorage to the crankshaft. This is accomplished by reason of the traveler nut 13 coming into contact with the outwardly projecting portions of pin 18 and pushing the entire rod 16 backwardly to release the expanding pressure of the wedge-shaped end 16a of the rod against the several segments 10b of the right-hand threaded end of the reaction shaft.

Being thus released from its locked relationship with the crankshaft, the reaction shaft 10 stops rotating, and is automatically unscrewed from the crankshaft recess 25 as the crankshaft continues turning. Naturally, the other parts of the tool are carried along with the reaction shaft 10.

Whereas this invention is here illustrated and described with respect to a particular preferred embodiment thereof, it is to be understood that various changes may be made therein and various other embodiments may be constructed by those skilled in the art, on the basis of the teachings hereof, without departing from the scope of the claims which follow.

I claim:

1. A tool for installing crankshaft hubs, comprising a tubular reaction shaft having an expansible, right-hand threaded end for screwing into the internally threaded recess provided in the forward end of a crankshaft; an actuating rod extending through the hollow interior of said reaction shaft, said rod having one of its ends of wedge formation and fitted within said expansible end of the reaction shaft, and having its other end threaded and projecting beyond the corresponding end of the reaction shaft; a nut screwed onto the threaded, projecting end of said actuating rod for tightening against the corresponding end of the reaction shaft to cause the wedge formation of the actuating rod to expand said expansible ends of the reaction shaft to bind its threads in the threads of said crankshaft; left-hand threads extending along said reaction shaft, exteriorly and intermediate the length thereof; a traveler nut screwed onto said left-hand threads for travel therealong; a pusher ring rotatably mounted at the forward face of said traveler nut for direct contact with the hub being installed; and abutment means extending from rigid connection with said actuating rod into the path of travel of said traveler nut at a predetermined position between said traveler nut and said expansible end of the reaction shaft for engagement by said traveler nut in effecting automatic release of said tool from the crankshaft.

2. The combination recited in claim 1, wherein the abutment means comprise projections extending from opposite sides of the actuating rod, and wherein the reaction shaft is provided with opposite longitudinal slots through which said projections extend.

3. The combination recited in claim 1, wherein a flange is provided externally of said reaction shaft at the termination of the said threaded and expansible end.

4. A tool for installing crankshaft hubs, comprising a reaction shaft having one of its ends provided with external, right-hand threads for screwing into the internally threaded recess provided in the forward end of a crankshaft; means for locking said threaded end of the reaction shaft within the said threaded recess of the crankshaft; a traveler nut threaded onto said reaction shaft beyond said threaded end thereof, by means of left-hand threads, so as to travel along said shaft toward said threaded end when the crankshaft is rotated clockwise; and abutment means engageable by said traveler nut for releasing said locking means, said abutment means being disposed at a predetermined location within the path of travel of said traveler nut, between the latter and said threaded end of the reaction shaft, and being connected to said locking means as a release therefor under pressure exerted by said traveler nut.

References Cited in the file of this patent

UNITED STATES PATENTS

| | | |
|---|---|---|
| 736,991 | Matthews | Aug. 25, 1903 |
| 1,851,421 | Conklin | Mar. 29, 1932 |
| 2,298,408 | Moyer | Oct. 13, 1942 |
| 2,363,804 | Reiland | Nov. 28, 1944 |

FOREIGN PATENTS

| | | |
|---|---|---|
| 260,724 | Great Britain | June 15, 1926 |
| 383,114 | Great Britain | Nov. 10, 1932 |